United States Patent [19]
DeLuca et al.

[11] 3,961,227
[45] June 1, 1976

[54] TELEPHONE CONNECTOR BLOCK

[75] Inventors: Paul V. DeLuca, Port Washington; William V. Carney, Valley Stream, both of N.Y.

[73] Assignee: Porta Systems Corporation, Syosset, N.Y.

[22] Filed: Feb. 13, 1975

[21] Appl. No.: 549,671

[52] U.S. Cl. .......................... 317/101 R; 339/14 R; 339/14 P; 179/97

[51] Int. Cl.[2] .......................................... H02B 1/16

[58] Field of Search ............... 339/14 R, 14 L, 14 P, 339/14 T, 18 B, 22 B, 253, 74, 256 R, 198 R, 198 GA, 198 P, 217 J, 188 R, 188 C; 179/1 PC, 91 R, 91 A, 97, 98; 317/101 R, 101 CC, 101 CP, 119

[56] References Cited

UNITED STATES PATENTS

| | | | |
|---|---|---|---|
| 2,650,286 | 8/1953 | Ramos | 339/253 R X |
| 2,942,230 | 6/1960 | Gluck | 339/253 R X |
| 2,970,286 | 1/1961 | Modrey | 339/14 R |
| 3,231,843 | 1/1966 | Antes et al. | 339/14 R |
| 3,354,421 | 11/1967 | Rodgers | 339/198 P |
| 3,518,611 | 6/1970 | Shores, Jr. | 179/98 X |

*Primary Examiner*—J D Miller
*Assistant Examiner*—Patrick R. Salce

[57] ABSTRACT

An improved telephone connector block including grounding means enabling the provision of current and voltage overload protection. Protector modules are provided with a grounding prong having a detent groove arranged peripherally thereabout at a free end thereof which engage a detent in a grounding strip on the connector block to simultaneously accomplish a grounding function and a resilient locking function.

3 Claims, 6 Drawing Figures

FIG. 1
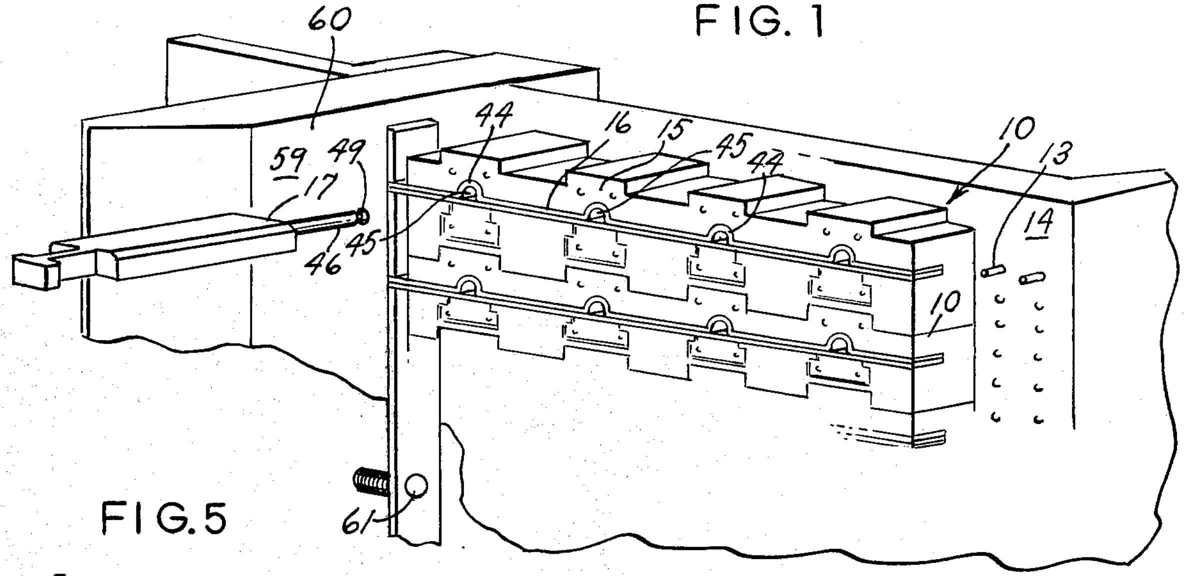
FIG. 5
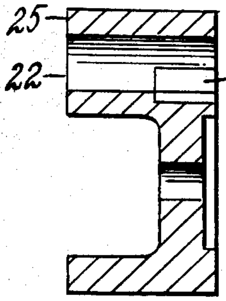
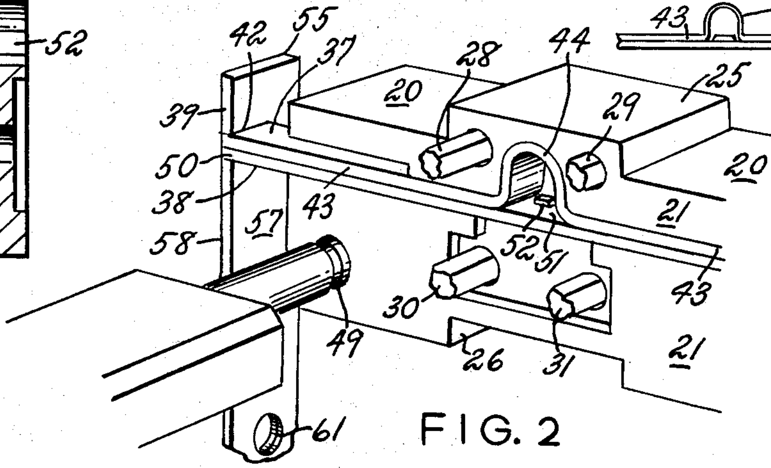
FIG. 2
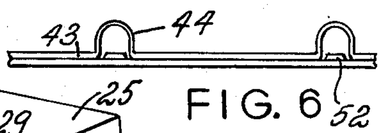
FIG. 6
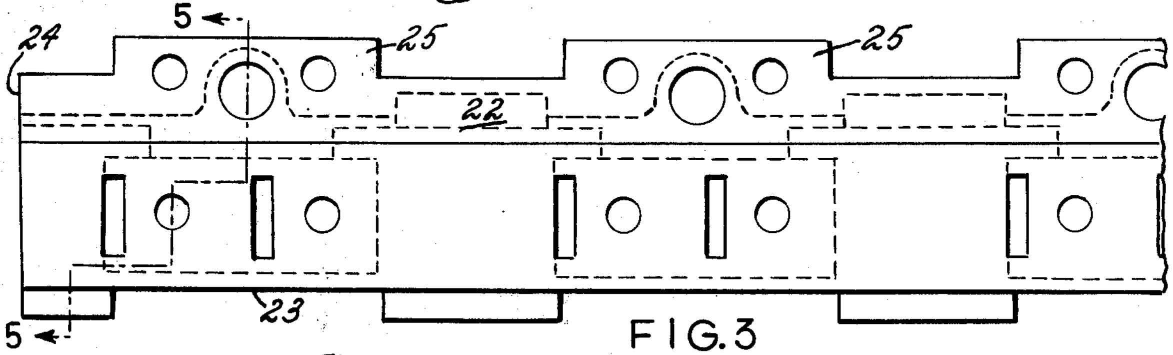
FIG. 3
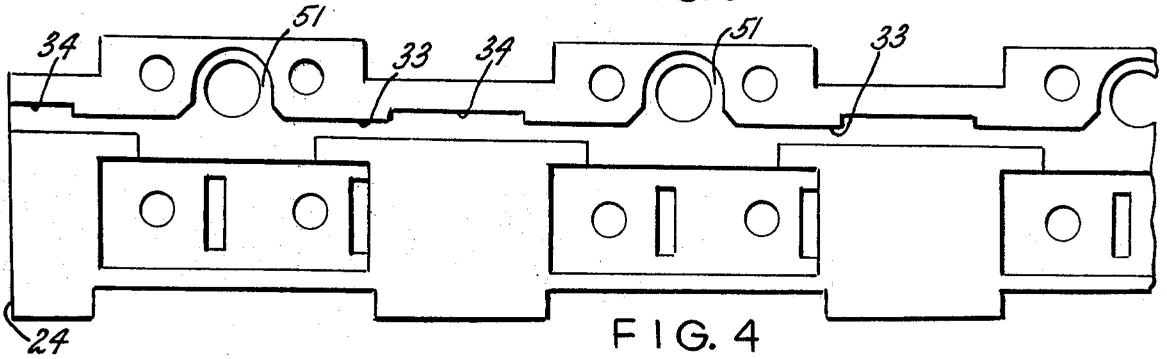
FIG. 4

TELEPHONE CONNECTOR BLOCK

BACKGROUND OF THE INVENTION

Connector block devices of compact type for use in connecting subscriber telephone lines within a telephone office are well known in the art, as exemplified by a copending application Ser. No. 410,449 filed Oct. 29, 1973, and assigned to the same assignee as the instant application. Many telephone offices have provision for offering grounding and overload protection to individual subscriber lines in locations other than the connector block. Connector blocks of the type disclosed in the above mentioned application have no provision for grounding and overload protective functions. It is also known in the art to provide such functions by structure incorporated into a plug-like protective module, as for example, that disclosed in U.S. Pat. No. 3,852,539 granted Dec. 3, 1974 and, again, assigned to the same assignee as the instant application.

SUMMARY OF THE INVENTION

Briefly stated, the invention contemplates the provision of a telephone connector block structure of the type disclosed in the above mentioned copending application, in which grounding means has been incorporated which permits not only the utilization of existing protector modules of the type disclosed in the above mentiond patent, but which provides detent means for the maintenance of the collector modules in engaged condition. The invention also contemplates a novel configuration of the grounding means facilitating manufacture, assembly, servicing and use.

BRIEF DESCRIPTION OF THE DRAWING

In the drawing, to which reference will be made in the specification, similar reference characters have been employed to designate corresponding parts throughout the several views.

FIG. 1 is a fragmentary exploded view in perspective of an embodiment of the invention.

FIG. 2 is an enlarged fragmentary view in perspective corresponding to the left central portion of FIG. 1.

FIG. 3 is a fragmentary front elevational view thereof.

FIG. 4 is a fragmentary rear elevational view thereof.

FIG. 5 is an offset sectional view as seen from the plane 5—5 in FIG. 3.

FIG. 6 is a view in elevation of a grounding strip element forming a part of the embodiment.

DETAILED DESCRIPTION OF THE DISCLOSED EMBODIMENT

In accordance with the invention, the device, generally indicated by reference character 10, is illustrated in FIGS. 1 and 2 in operative connection with a connector block of a type disclosed in our copending application Ser. No. 410,449 above mentioned. As this construction is fully described in the said application, the details thereof need not be further considered herein. FIG. 2 of that application discloses connecting pins indicating by reference character 13 in FIG. 1 of the instant application which normally connect with subscriber telephone lines (not shown). The pins 13 are employed to support a plurality of devices 10 in nested relation upon a surface 14 of the connector block 11, as will more fully appear herein. The device 10 comprises broadly: a molded body element 15 and a conductive detent and grounding strip element 16 having means interconnecting with the conductors of a single telephone subscriber line. The details of the module 17 are described in U.S. Pat. No. 3,852,539, above mentioned.

The body element 15 is bounded by an upper surface 20, a forward exposed surface 21, a rearward surface 22, a lower surface 23, and end surfaces, one of which is indicated by reference character 24. A plurality of upwardly extending projections 25 engage corresponding recesses 26 in adjacent devices 10 to provide resistence to accidentally applied forces in a horizontal plane, and assist in assembly of a plurality of devices 10 upon the surface 14.

The forward surface 21, has areas mounting four terminal pins 28, 29, 30 and 31 (FIG. 2) which connect with corresponding pins (not shown) on the connector block, and engage recesses in the module 17. Disposed between the upper pins 28–29, and the lower pins 30–31 is an elongated groove 33 extending the entire length of the device 10 and supporting the element 16. The groove includes laterally extending portions 34. A recess 35 surrounds the lower pins 30–31, and underlies segments of the strip element 16.

The strip element 16 includes an upper strip member 37, a lower strip member 38, and a grounding bar member 39.

The upper strip member 37 includes a first end 42 soldered or spot welded to the member 39. A plurality of planar segments 43 interconnect with a corresponding plurality of looped or arched segments 44, each defining an opening 45 for the reception of a grounding prong or pin 46 on a module 17, which differs from that described in the above mentioned patent only in the provision of a detent groove 49 adjacent a free end thereof.

The lower strip member 38 is of length substantially equal to that of the upper strip member 37, and is substantially planar throughout its length. It includes a first end 50 also electrically communicating with the bar member 39, and has on an upper surface 51 thereof a plurality of detent teeth 52, so positioned as to lie directly beneath the arched segments 44 of the upper strip member 37.

The bar member 39 is generally vertically oriented, and communicates with a plurality of strip elements 16 to provide a grounding connection for each. It includes an upper end 55 and a lower end (not shown). An inner surface 57 is generally exposed, and an outer surface 58 overlies a surface 59 on a flange 60 of the connector block 11. A threaded opening 61, repeated at periodic intervals, provides for a mounting bracket screw (not shown) electrically and mechanically communicating with a conventional frame (not shown) in turn communicating with a source of ground potential.

As best seen in FIG. 1, a plurality of devices 10 may be installed upon a single connector block 11, and the grounding strip element 16 positioned either before or after such installation. The protective modules 17 are plugged into a respective device 10 as shown in FIGS. 1 and 2, during which time the grounding prong electrically interconnects with the opening 45. As the prong is inserted, the portion of the lower strip member 38 carrying the corresponding detent tooth 52 flexes into the recessed area 35 until it engages the corresponding groove 49 to secure the protective module in detent position.

It will be observed that the metallic and synthetic resinous parts of the device may be formed separately, and assembled as force fits without the use of screws or other fastening means, thereby facilitating assembly.

We wish it to be understood that we do not consider the invention limited to the precise details of structure shown and set forth in this specification, for obvious modifications will occur to those skilled in the art to which the invention pertains.

We claim:

1. An improved grounding means for use in conjunction with a telephone connector block and a grounding type protector module comprising: a molded body element having means thereon for electrical and mechanical interconnection with a surface of said telephone connector block, said body element defining a plurality of terminals corresponding in configuration to those of said protector module, and defining an elongated groove in an exposed surface thereof; a grounding strip element disposed within said groove and extending to one end of said molded body element, an electrically conductive grounding bar means communicating with said ground strip element and a source of ground potential; said protective module having a grounding prong, said body element having an opening selectively accommodating said prong, said grounding strip element bordering a portion of said opening and establishing communication therewith upon insertion of said prong therein; said grounding strip element including a first strip member having a plurality of planar segments interconnected by a corresponding plurality of arched segments defining an opening, and a second generally planar strip member abutting said first strip member at spaced intervals; said second strip member having detent means thereon in the area of said arched portions of said first strip member.

2. Structure in accordance with claim 1, in combination with said protective module; said prong on said protective module having means on a free end thereof corresponding to and cooperating with said detent means.

3. Structure in accordance with claim 1, further characterized in said body element having a recess communicating with said groove, and disposed beneath said detent means to permit the flexing thereof upon relative movement between said grounding prong and said opening.

* * * * *